United States Patent
Aggarwal et al.

(10) Patent No.: US 8,750,267 B2
(45) Date of Patent: Jun. 10, 2014

(54) DETECTION OF FALSIFIED WIRELESS ACCESS POINTS

(75) Inventors: Alok Aggarwal, Foster City, CA (US); Edward Thomas Lingham Hardie, Menlo Park, CA (US); Saumitra Mohan Das, San Jose, CA (US); Rajarshi Gupta, Santa Clara, CA (US); Ayman Fawzy Naguib, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 418 days.

(21) Appl. No.: 12/651,785

(22) Filed: Jan. 4, 2010

(65) Prior Publication Data

US 2010/0172259 A1 Jul. 8, 2010

Related U.S. Application Data

(60) Provisional application No. 61/142,584, filed on Jan. 5, 2009.

(51) Int. Cl.
*H04W 4/00* (2009.01)

(52) U.S. Cl.
USPC .......................................................... 370/338

(58) Field of Classification Search
USPC ......................... 370/229–235, 252, 328–339; 455/456.1; 709/224–225; 726/2, 3, 21, 726/23, 27
See application file for complete search history.

(56) References Cited

U.S. PATENT DOCUMENTS

| | | |
|---|---|---|
| 6,477,380 B1 | 11/2002 | Uehara et al. |
| 6,681,099 B1 | 1/2004 | Keranen et al. |
| 6,754,488 B1 * | 6/2004 | Won et al. ...................... 455/424 |
| 7,079,851 B2 | 7/2006 | Makuta |
| 7,130,646 B2 | 10/2006 | Wang |
| 7,138,946 B2 | 11/2006 | Tamaki et al. |
| 7,319,878 B2 * | 1/2008 | Sheynblat et al. ......... 455/456.3 |

(Continued)

FOREIGN PATENT DOCUMENTS

| | | |
|---|---|---|
| CN | 1269947 A | 10/2000 |
| CN | 1444833 A | 9/2003 |

(Continued)

OTHER PUBLICATIONS

Watkins et al, A Passive Approach to Rogue Access Point Detections, IEEE, 6 pages, 2007.*

(Continued)

*Primary Examiner* — Frank Duong
(74) *Attorney, Agent, or Firm* — Jimmy Cheng (57) ABSTRACT

Apparatuses and methods for detecting falsified wireless access points are presented. A method includes identifying a target wireless access point for validation and measuring a round trip time delay to the wireless access point. The method also includes determining an expected processing delay of the wireless access point, analyzing the measured round trip time delay and the expected processing delay, and validating the wireless access point based upon the analysis. An apparatus includes a wireless transceiver, a processing unit coupled to the wireless transceiver, and a memory coupled to the processing unit. The processing unit is configured to identify a target wireless access point for validation, measure a round trip time delay to the wireless access point, determine an expected processing delay of the wireless access point, analyze the measured round trip time delay and the expected processing delay, and validate the wireless access point based upon the analysis.

52 Claims, 5 Drawing Sheets

(56) References Cited

U.S. PATENT DOCUMENTS

| | | | |
|---|---|---|---|
| 7,346,120 B2 | 3/2008 | McCorkle | |
| 7,383,049 B2 | 6/2008 | Deloach, Jr. et al. | |
| 7,469,139 B2 | 12/2008 | Van De Groenendaal | |
| 7,525,484 B2 | 4/2009 | Dupray et al. | |
| 7,574,216 B2 | 8/2009 | Leitch et al. | |
| 7,672,283 B1* | 3/2010 | Chang et al. | 370/338 |
| 7,676,218 B2* | 3/2010 | Ballai | 455/411 |
| 7,716,740 B2* | 5/2010 | Robert et al. | 726/23 |
| 7,751,829 B2 | 7/2010 | Masuoka et al. | |
| 7,756,615 B2 | 7/2010 | Barfoot et al. | |
| 7,810,154 B2* | 10/2010 | Hum et al. | 726/22 |
| 7,893,873 B2 | 2/2011 | Black et al. | |
| 7,899,006 B2 | 3/2011 | Boyd | |
| 7,983,622 B1 | 7/2011 | Vaughan | |
| 8,165,150 B2 | 4/2012 | Aweya et al. | |
| 8,238,942 B2 | 8/2012 | Gast et al. | |
| 8,244,272 B2 | 8/2012 | Morgan et al. | |
| 2001/0053699 A1 | 12/2001 | McCrady et al. | |
| 2002/0118723 A1 | 8/2002 | McCrady et al. | |
| 2002/0173295 A1 | 11/2002 | Nykanen et al. | |
| 2003/0125046 A1 | 7/2003 | Riley et al. | |
| 2003/0129995 A1 | 7/2003 | Niwa et al. | |
| 2003/0182053 A1 | 9/2003 | Swope et al. | |
| 2004/0003285 A1* | 1/2004 | Whelan et al. | 713/201 |
| 2004/0023640 A1* | 2/2004 | Ballai | 455/411 |
| 2004/0104842 A1 | 6/2004 | Drury et al. | |
| 2004/0203539 A1 | 10/2004 | Benes et al. | |
| 2004/0203931 A1 | 10/2004 | Karaoguz | |
| 2004/0235499 A1 | 11/2004 | Tanaka et al. | |
| 2004/0258012 A1 | 12/2004 | Ishii | |
| 2005/0058081 A1 | 3/2005 | Elliott | |
| 2005/0130669 A1 | 6/2005 | Mizugaki et al. | |
| 2005/0130699 A1 | 6/2005 | Kim et al. | |
| 2005/0208900 A1 | 9/2005 | Karacaoglu | |
| 2006/0120334 A1 | 6/2006 | Wang et al. | |
| 2006/0189329 A1 | 8/2006 | Anderson | |
| 2006/0195252 A1 | 8/2006 | Orr et al. | |
| 2006/0200862 A1 | 9/2006 | Olson et al. | |
| 2006/0256838 A1 | 11/2006 | Yarkosky | |
| 2007/0002813 A1 | 1/2007 | Tenny et al. | |
| 2007/0099646 A1 | 5/2007 | Tanaka et al. | |
| 2007/0115842 A1 | 5/2007 | Matsuda et al. | |
| 2007/0121560 A1* | 5/2007 | Edge | 370/338 |
| 2007/0135134 A1 | 6/2007 | Patrick | |
| 2007/0265020 A1 | 11/2007 | Cuffaro | |
| 2008/0068257 A1 | 3/2008 | Mizuochi | |
| 2008/0097966 A1 | 4/2008 | Choi et al. | |
| 2008/0101227 A1 | 5/2008 | Fujita et al. | |
| 2008/0101277 A1 | 5/2008 | Taylor et al. | |
| 2008/0180315 A1 | 7/2008 | Tarlow et al. | |
| 2008/0198811 A1 | 8/2008 | Deshpande et al. | |
| 2008/0232297 A1 | 9/2008 | Mizugaki et al. | |
| 2008/0250498 A1 | 10/2008 | Butti et al. | |
| 2008/0287056 A1 | 11/2008 | Van De Groenendaal | |
| 2008/0287139 A1 | 11/2008 | Carlson et al. | |
| 2008/0299993 A1 | 12/2008 | Gordon et al. | |
| 2008/0301262 A1 | 12/2008 | Kinoshita et al. | |
| 2009/0011713 A1 | 1/2009 | Abusubaih et al. | |
| 2009/0135797 A1 | 5/2009 | Zhang et al. | |
| 2009/0257426 A1 | 10/2009 | Hart et al. | |
| 2009/0286549 A1 | 11/2009 | Canon et al. | |
| 2010/0020776 A1 | 1/2010 | Youssef et al. | |
| 2010/0067393 A1 | 3/2010 | Sakimura et al. | |
| 2010/0081451 A1 | 4/2010 | Mueck et al. | |
| 2010/0128617 A1 | 5/2010 | Aggarwal et al. | |
| 2010/0128637 A1 | 5/2010 | Aggarwal et al. | |
| 2010/0130229 A1 | 5/2010 | Sridhara et al. | |
| 2010/0130230 A1 | 5/2010 | Aggarwal et al. | |
| 2010/0135178 A1* | 6/2010 | Aggarwal et al. | 370/252 |
| 2010/0141515 A1 | 6/2010 | Doucet et al. | |
| 2010/0157848 A1 | 6/2010 | Das et al. | |
| 2010/0159958 A1 | 6/2010 | Naguib et al. | |
| 2011/0092226 A1 | 4/2011 | Maher et al. | |
| 2011/0173674 A1 | 7/2011 | Thomson et al. | |
| 2011/0217987 A1 | 9/2011 | Van De Groenendaal | |
| 2011/0269478 A1 | 11/2011 | Das et al. | |
| 2013/0072227 A1 | 3/2013 | Morgan et al. | |
| 2013/0072228 A1 | 3/2013 | Naguib et al. | |
| 2013/0143497 A1 | 6/2013 | Das et al. | |
| 2013/0223261 A1 | 8/2013 | Aggarwal et al. | |
| 2013/0237246 A1 | 9/2013 | Aggarwal et al. | |

FOREIGN PATENT DOCUMENTS

| | | |
|---|---|---|
| CN | 1509561 A | 6/2004 |
| CN | 1606840 A | 4/2005 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101248626 A | 8/2008 |
| EP | 1050977 A2 | 11/2000 |
| EP | 1180696 A2 | 2/2002 |
| EP | 1253404 A2 | 10/2002 |
| EP | 1253437 A2 | 10/2002 |
| EP | 1398913 A2 | 3/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11326484 A | 11/1999 |
| JP | 2001007764 A | 1/2001 |
| JP | 2001147262 A | 5/2001 |
| JP | 2001268622 A | 9/2001 |
| JP | 2002040121 A | 2/2002 |
| JP | 2002098747 A | 4/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006148457 A | 6/2006 |
| JP | 2006170891 A | 6/2006 |
| JP | 2006311475 A | 11/2006 |
| JP | 2007089006 A | 4/2007 |
| JP | 2007127584 A | 5/2007 |
| JP | 2007212420 A | 8/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008104029 A | 5/2008 |
| JP | 2008128728 A | 6/2008 |
| JP | 2008522181 A | 6/2008 |
| JP | 2008257769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| KR | 20040068352 A | 7/2004 |
| TW | I240085 B | 9/2005 |
| TW | I250303 B | 3/2006 |
| TW | 200618539 | 6/2006 |
| TW | 200718972 | 5/2007 |
| TW | I292829 B | 1/2008 |
| TW | 200816840 A | 4/2008 |

(56) References Cited

FOREIGN PATENT DOCUMENTS

| TW | I300852 B | 9/2008 |
|---|---|---|
| WO | WO9913662 | 3/1999 |
| WO | 0120260 A1 | 3/2001 |
| WO | 0123904 A2 | 4/2001 |
| WO | WO03038466 | 5/2003 |
| WO | WO2007021292 A2 | 2/2007 |
| WO | WO2007056738 | 5/2007 |
| WO | WO2007121488 A1 | 10/2007 |
| WO | 2008012188 A1 | 1/2008 |
| WO | 2008057737 A2 | 5/2008 |
| WO | WO-2008051124 A1 | 5/2008 |
| WO | WO2008066927 | 6/2008 |
| WO | WO-2008085440 A2 | 7/2008 |
| WO | 2008121878 A1 | 10/2008 |
| WO | 2008140880 A1 | 11/2008 |
| WO | WO2010059934 | 5/2010 |

OTHER PUBLICATIONS

Gunther et al, Measuring Round Trip Times to Determine the Distance between WLAN Nodes, In Proc. of Networking 2005, Waterloo, Canada, 12 pages, May 2005.*

Lim et al, Wireless Intrusion Detection and Response, IEEE, 8 pages, 2003.*

International Search Report and Written Opinion—PCT/US2010/020114, International Search Authority—European Patent Office—Aug. 26, 2010.

Awad, A., et al., "Adaptive Distance Estimation and Localization in WSN Using RSSI Measures" 10th Euromicro Conference on Gidital System Design Architectures, Methods, and Tools (DSD 2007) Los Alamitos, CA IEEE Computer Soc., Piscataway, NJ, US Aug. 29, 2007 pp. 471-478.

Gerasenko S., et al., "Beacon Signals: What, Why, How, and Where", IEEE Computer Society, Computer, vol. 34, No. 10, pp. 108-110, Oct. 2001, doi:10.1109/2.955103.

Golden Stuart A. et al., "Sensor Measurements for WI-FI Location with Emphasis on Time-of-Arrival Ranging," IEEE Transactions on Mobile Computing, vol. 6 (10), 2007.

Israel Martin-Escalona, et al., "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I . Passive-TDOA Positioning Algorithm.

Jan Blumenthal, et al., "Precise Positioning with a Low Complexity Algorithm in Ad hoc Wireless Sensor Networks" PIK. Praxis Der Informationsverarbeitung Und Kommunikation, Saur, Muenchen, De LNKD—DOI:10.1515/PIK0.2005.80, [Online] vol. 28, No. 2, Jun. 1, 2005, pp. 80-85, XP002495976.

Mao, et al., "Wireless sensor network localization techniques" Computer Networks, Elsevier Science Publishers B.V;, Amsterdam, NL LNKD—DOI: 10.1016/ J.Comnet. 2006.11.018, vol. 51, No. 10, May 6, 2007, pp. 2529-2553, XP022063022 ISSN: 1389-1286.

McCrady, et al. "Mobile Ranging with Low Accuracy Clocks", Radio and Wireless Conference 1999, pp. 85-88.

Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.

Xinrong Li, et al., "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, pp. 3015-3020, XP010525129 ISBN: 978-0-7803-6507-0 abstract p. 3017, right-hand column.

Manolakis D.E., "Efficient Solution and Performance analysis of 3-D Position Estimatin by Trilateration", IEEE Transactions on Aerospace and Electronic Systems, vol. 32, No. 4, Oct. 1996.

Taiwan Search Report—TW099100118—TIPO—Jan 22, 2013.

European Search Report—EP12008413—Search Authority —The Hague—May 8, 2013.

* cited by examiner

DETECTION OF FALSIFIED WIRELESS ACCESS POINTS

CLAIMS OF PRIORITY UNDER 35 U.S.C. §119

The present application for patent claims priority to Provisional Application No. 61/142,584 entitled "USE OF CHARACTERISTIC PROCESSING DELAY TO DETECT FALSIFIED MAC ID" filed Jan. 5, 2009, and assigned to the assignee hereof and hereby expressly incorporated by reference herein.

REFERENCE TO CO-PENDING APPLICATIONS FOR PATENT

The present application for patent is related to the following co-pending U.S. patent applications:

"WIRELESS POSITION DETERMINATION USING ADJUSTED ROUND TRIP TIME MEASUREMENTS" by Aggarwal et al., filed on Nov. 19, 2009 having Ser. No. 12/622,289, assigned to the assignee hereof, and expressly incorporated by reference herein.

"POST-DEPLOYMENT CALIBRATION FOR WIRELESS POSITION DETERMINATION" by Naguib et al., filed on Dec. 21, 2009 having Ser. No. 12/643,676, assigned to the assignee hereof, and expressly incorporated by reference herein.

FIELD OF DISCLOSURE

Aspects of this disclosure generally relate to wireless communication systems, and more specifically, to the use of processing delays to detect falsified wireless access points.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

In conventional digital cellular networks, position location capability can be provided by Advanced Forward Link Trilateration (AFLT). AFLT may compute the position of a wireless device from the wireless device's measured time of arrival of radio signals transmitted from a plurality of base stations. Improvements to AFLT have been realized by utilizing hybrid position location techniques, where the mobile station may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques. Additionally, with the increased proliferation of micro electro-mechanical systems (MEMS), small, on-board sensors may be used to provide additional relative position, velocity, acceleration and/or orientation information.

However, position location techniques based upon signals provided by SPS and/or cellular base stations may encounter difficulties when the mobile device is operating within a building and/or within urban environments. In such situations, multipath and/or degraded signal strength can significantly reduce position accuracy, and can slow the "time-to-fix" to unacceptably long time periods. Such shortcomings of SPS and cellular positioning may be overcome by exploiting signals used in existing wireless data networks, such as Wi-Fi (e.g., Institute of Electrical and Electronics Engineers (IEEE) 802.11x standards) and/or WiMAX (IEEE 802.16), and having elements within the network infrastructure derive position information of the mobile device. Techniques used in such wireless data networks may exploit round trip time (RTT) and/or signal strength measurements (e.g., RSSI) derived from signals utilized within these networks. Utilizing such measurement techniques to accurately determine position typically involves knowledge of the configuration of various elements within the network, such as, for example, the location of the wireless access points and various processing delays associated with the wireless access points.

In some instances, particularly when wireless information and/or location-based services are offered in public forums (e.g., a shopping mall, office building, etc.), potential security risks can arise given the possibility of malicious entities exploiting the network to gain unauthorized access to sensitive information. Such security risks may include "man in the middle", "spoofing" and/or "phishing" types of cyber attacks. Such attacks may be based upon the malicious entity successfully masquerading as a legitimate entity by manipulating network protocols, falsifying credentials, and/or fooling a user to compromise network integrity for gaining illegitimate advantage. In particular, one form of attack may arise when the malicious entity sets up equipment to masquerade as a legitimate wireless access point, thus presenting a falsified wireless access point to unsuspecting users. The falsified wireless access point could be used to present unauthorized information and/or position data to the user, compromise identity data, credit card information, etc.

Accordingly, it may be desirable to leverage existing knowledge of the behavior of wireless access points, and/or algorithms which may be used in their calibration for determining position, to provide a layer of security for detecting falsified wireless access points to prevent the malicious entity from exploiting the wireless network.

SUMMARY

Exemplary embodiments of the invention are directed to apparatuses and methods for detecting a falsified wireless access point.

One embodiment can include a method of detecting a falsified wireless access point over a wireless network. The method may include identifying a wireless access point for validation, and measuring a round trip time delay to the wireless access point. The method may further include determining an expected processing delay of the wireless access point, analyzing the measured round trip time delay and the expected processing delay, and validating the wireless access point based upon the analysis.

In another embodiment, an apparatus for detecting a falsified wireless access point is presented. The apparatus may include a wireless transceiver, a processing unit coupled to the wireless transceiver, and a memory coupled to the processing unit. The processing unit is configured to identify a wireless access point for validation, measure a round trip time delay to the wireless access point, determine an expected processing delay of the wireless access point, analyze the measured round trip time delay and the expected processing delay, and validate the wireless access point based upon the analysis.

Various embodiments can provide the advantage of securing a mobile station from unauthorized access to user data. Techniques herein may leverage existing information and algorithms, which may already be employed for position determination of the mobile station, to detect falsified wireless access points. By leveraging existing information and/or algorithms, the additional security can be provided with little additional cost.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by mechanisms and/or processing units configured to perform the various actions, for example, by specific circuits (e.g., application specific integrated circuits (ASICs)), by program instructions being executed by one or more processing units, or by a combination of these. Additionally, these sequence of actions described herein can be considered to be embodied entirely within any form of computer/machine readable storage medium having stored therein a corresponding set of computer/machine instructions that upon execution would cause an associated processing unit/machine to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In addition to exchanging data over a network, a mobile station may also determine its position using information derived from signals exchanged with a plurality of wireless access points. Such signal-derived information may include for example, round trip time (RTT) and/or received signal strength (RSSI). Auxiliary information regarding the wireless access points, such as, for example, their processing delays and positions, may also be used in position determination. The signal-derived information and the auxiliary information may be utilized along with one or more wireless signal models (e.g., RTT and/or RSSI based models) to provide accurate estimates of position for the mobile station.

One would therefore appreciate that accurate knowledge of the processing delays associated the wireless access points can affect the accuracy of the position solutions. Such delays may be determined a-priori and pre-stored in memory tables, or may be determined in-situ using calibration techniques, such as, for example those described in "WIRELESS POSITION DETERMINATION USING ADJUSTED ROUND TRIP TIME MEASUREMENTS" by Aggarwal et al., which has been incorporated by reference. Advantageously, these processing delays may also be used as characterizing information for wireless access points, and in some instances, can be used to characterize a particular model and/or manufacturer. This feature may be leveraged to enhance the security of a mobile user by detecting falsified wireless access points.

In more detail, wireless access points can be implemented with a hardware Media Access Controller (MAC) which may always use the same hardware paths to do the initial processing of received packets. As a result, the wireless access point with a hardware MAC may typically have consistent processing delays. In other words, the wireless access point (WAP), for any pair of incoming packets of the same type received by the WAP, may expend the same amount of processing time prior to transmitting a response back to the mobile station (e.g., an ACK response). Moreover, because this consistency is derived from the hardware paths in the relevant chipset, all devices sharing that chipset may also share very similar processing times. As will be explained in more detail below, an identifier (e.g., a MAC ID) asserted by a wireless access point in a beacon signal may encode its manufacturer and model, and thus it may be compared with recorded known chipsets associated with specific identifier ranges.

Accordingly, embodiments of the invention may allow a mobile station to compare the overall response time from a wireless access point with expected processing delays (e.g., either known a-priori or determined by the mobile station during calibration) in order to detect falsified access points. For example, one detection approach may include determining when the overall response time is out of the range of possible times for the chipset associated with the wireless access point's identifier.

As used herein, the term "falsified wireless access point" may be used to designate a device masquerading as a wireless access point (e.g., a laptop with wireless networking capability) which may be placed among the legitimate wireless access points.

Figure 1:
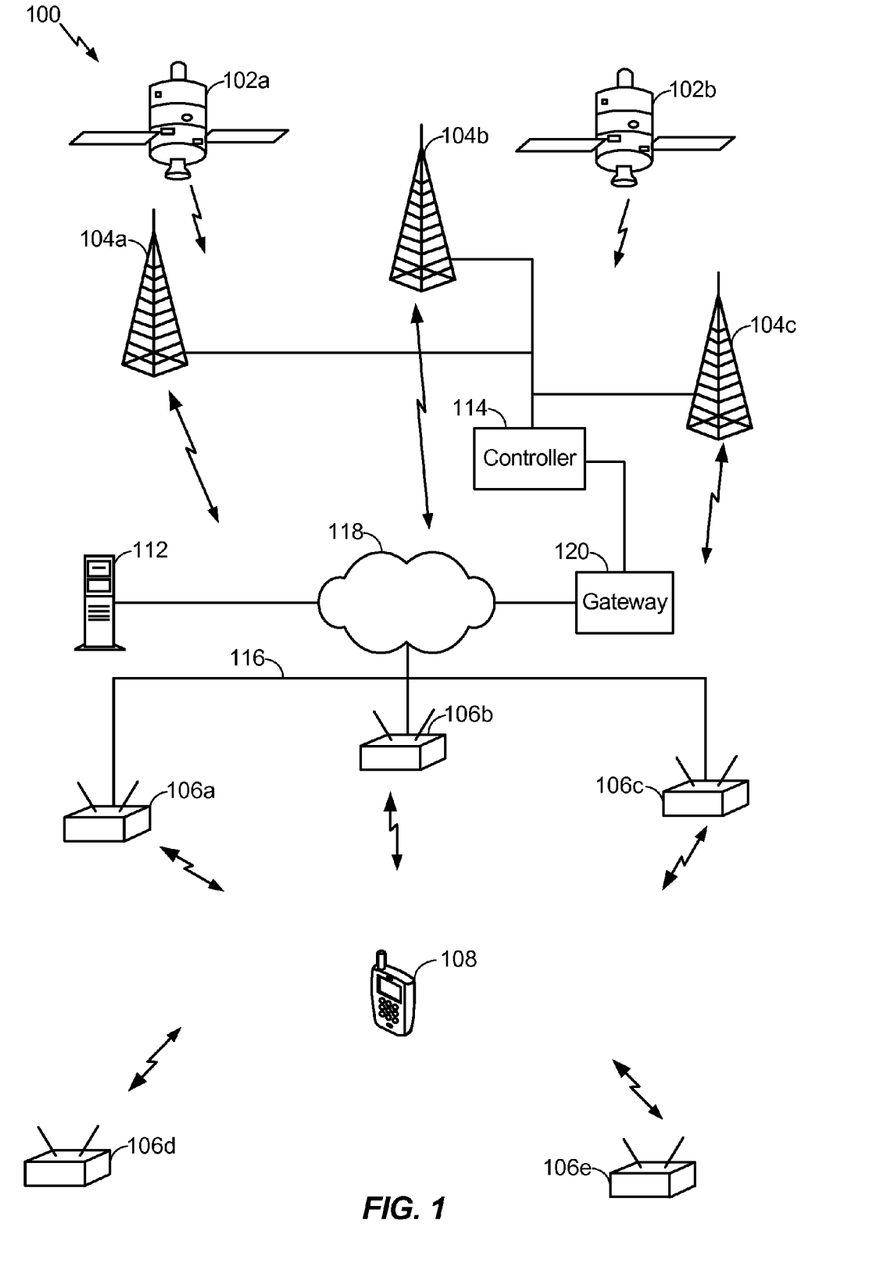
FIG. 1 is a diagram of an exemplary operating environment for a mobile station in communications with one or more wireless networks consistent with an embodiment of the disclosure.

FIG. 1 is a diagram of an exemplary operating environment 100 for a mobile station 108 in communications with one or more wireless networks consistent with an embodiment of the disclosure. The operating environment 100 may contain one or more different types of wireless communication systems and/or wireless positioning systems. In the embodiment shown in FIG. 1, a Satellite Positioning System (SPS) may be used as an independent source of position information for the mobile station 108. The mobile station may include one or more dedicated SPS receivers specifically designed to receive signals for deriving geo-location information from the SPS satellites.

The operating environment 100 may also include a back end network (also referred to herein as a back haul network) which may be a wide area network. The back end network may include one or more wired and/or wireless networks, and can also provide Internet and/or cellular data network access. The back end network may further include one or more Wide Area Network Wireless Access Points (WAN-WAPs) 104, which may be used for wireless voice and/or data communication, and potentially as another source of independent position information for the mobile station 108. The WAN-WAPs 104 may be incorporated into a wireless wide area network (WWAN), which may include cellular base stations at known locations, and/or other wide area wireless systems, such as, for example, WiMAX (e.g., 802.16). The WWAN may further include one or more Controllers 114 (such as, for example, a Base Station Controller), and a Gateway 120 to interconnect the WWAN with a wide area network 118. Other known network components may further be included but are not shown in FIG. 1 for simplicity. Typically, each WAN-WAP 104a-104c within the WWAN may operate from fixed, known positions, and provide network coverage over large metropolitan and/or regional areas.

The back end network may further include a separate server 112, which may be connected to the wide area network 118. The server 112 may assist the mobile station 108 in determining its positions by providing information regarding individual wireless access points and/or information regarding other network elements. For example, the server 112 may provide mobile station with the expected processing delays for a requested wireless access point. The server 112 also may assist the mobile station 108 in calibration to determine processing delays using in-network packet exchanges. The back end network may also include an interconnecting network 116 for interconnecting the local area network to the wide area network 118. Network 116 may be a wired network as shown in FIG. 1; however, in other embodiments, it may be, either in whole or in part, a wireless network. Moreover, various embodiments may have the server functionality placed in another portion of the back end network.

The operating environment 100 may further include a wireless local area network (WLAN). The WLAN may include one or more Local Area Network Wireless Access Points (LAN-WAPs) 106. The WLAN may be used for wireless voice and/or data communication, as well as another independent source of position data. Each LAN-WAPs 106a-106e may connect to the back end network in a wireless and/or wired manner. For example, as shown in FIG. 1, LAN-WAPs 106a-106c may interface to the wide area network 118 over the interconnecting network 116, while the LAN-WAPs 106d and 106e may communicate to the back-end network using a wireless connection. When in range, the mobile station 108 may wirelessly exchange packets with one or more LAN-WAPs 106. The WLAN may typically operate in buildings and perform communications over smaller geographic regions than a WWAN, and it may operate under the protocols of a Wi-Fi network (IEEE 802.11x), Bluetooth Network, a femtocell, etc.

The mobile station 108 may derive other independent position information from any one or a combination of the SPS transmitters 102, the WAN-WAPs 104, and/or the LAN-WAP 106. Each of the aforementioned systems can provide an independent estimate of the position for mobile station 108 using different techniques. In some embodiments, the mobile station 108 may combine the solutions derived from each of the different systems to improve the accuracy of the position data. In the section below, details for conventionally determining the position of the mobile station 108 are briefly presented.

Further referring to FIG. 1, the mobile station 108 may be representative of any type of portable wireless device. Thus, by way of example but not limitation, a mobile station may include a radio device, a cellular telephone device, a computing device, a personal communication system (PCS) device, a Personal Information Manager (PIM), a Personal Navigation Device (PND), a Personal Digital Assistant (PDA), a laptop, or other like movable wireless communication equipped device, appliance, or machine. The term "mobile station" is also intended to include devices which communicate with a Personal Navigation Device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

As used herein, the term "wireless device" may refer to any type of wireless communication device/machine which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

When deriving position data using the SPS, the mobile station 108 may utilize a receiver specifically designed for use with the SPS that extracts position, using conventional techniques, from a plurality of signals transmitted by available SPS transmitters 102. The transmitters may be positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS)

such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile station 108 may include a cellular transceiver and processing unit that can exploit the base station signals to derive position. It should be understood that a digital cellular network may include additional base stations or other resources shown in FIG. 1. While WAN-WAPs 104 may actually be moveable or otherwise capable of being relocated, for illustration purposes it will be assumed that they are essentially arranged in a fixed position. The mobile station 108 may also perform position determination using conventional time-of-arrival techniques such as, for example, Advanced Forward Link Trilateration (AFLT). In other embodiments, any WAN-WAP 104a-104c may take the form of a WiMAX wireless networking base station. The mobile station 108 may determine its position using time-of-arrival (TOA) techniques from signals provided by the WAN-WAPs 104. The mobile station 108 may determine positions either in a stand-alone mode, or using the assistance of server 112 and/or the wide area network 118 using conventional TOA techniques. Note that embodiments of the disclosure may include having the mobile station 108 determine position information using WAN-WAPs 104 which are different types. For example, some WAN-WAPs 104 may be cellular base stations, and other WAN-WAPs may be WiMAX base stations. In such an operating environment, the mobile station 108 may be able to exploit the signals from each different type of WAN-WAP, and further combine the derived position solutions to improve accuracy.

When deriving independent position information of any mobile station based upon conventional techniques using the WLAN, such mobile station 108 may utilize time of arrival and/or signal strength techniques with the assistance of the server 112 and the wide area network 118. The conventional position determination techniques may also be used in conjunction with other various wireless communication networks such as a wireless wide area network (WWAN), a wireless local area network (WLAN), a wireless personal area network (WPAN), and so on.

The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a LTE (Long Term Evolution) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
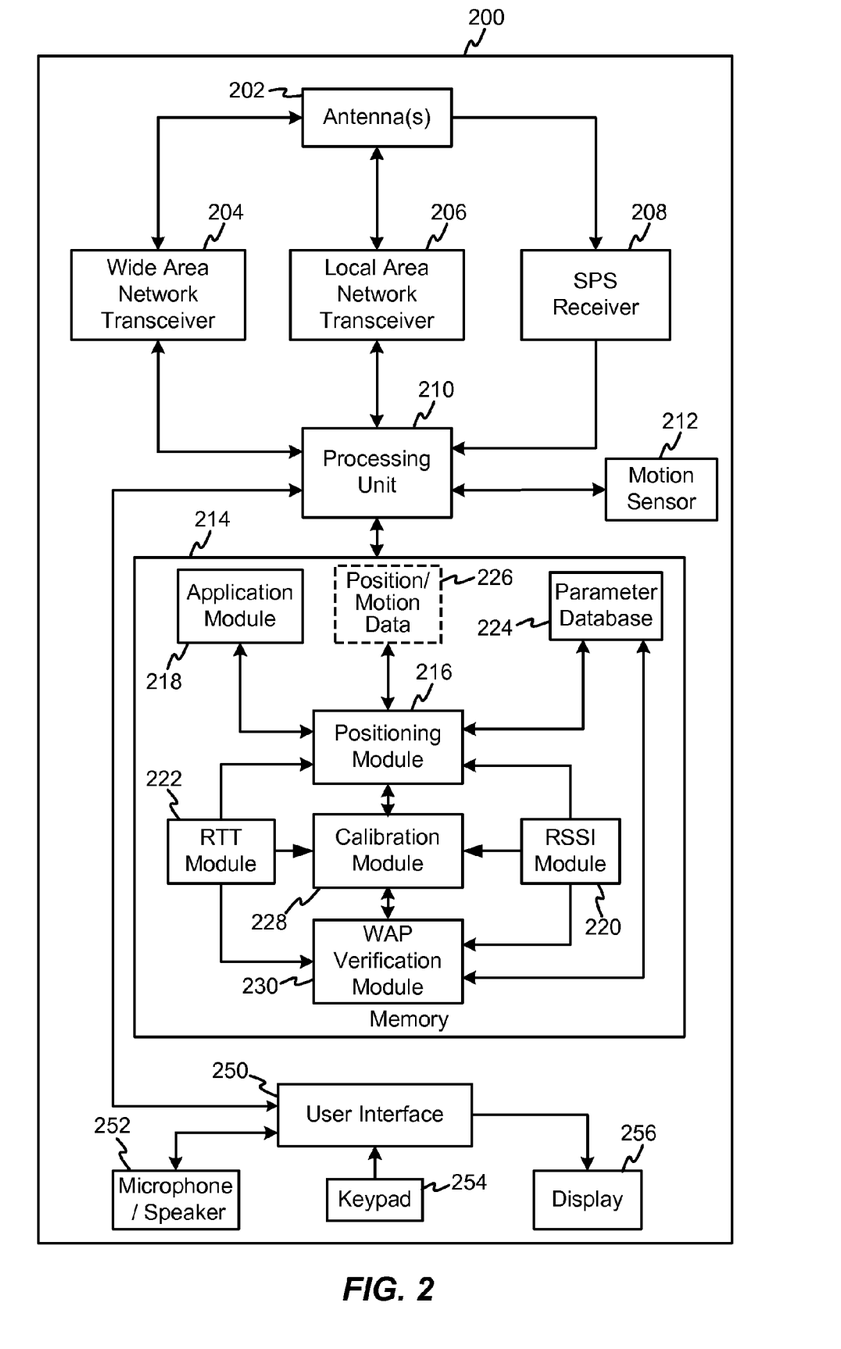
FIG. 2 is a block diagram illustrating various components of an exemplary mobile station.

FIG. 2 is a block diagram illustrating various components of an exemplary mobile station 200 (e.g., such as mobile station 108 of FIG. 1). For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile station 200 may include one or more wide area network transceiver(s) 204 that may be connected to one or more antennas 202. The wide area network transceiver 204 may comprise suitable devices, hardware, and/or software for communicating with and/or detecting signals to/from WAN-WAPs 104, and/or directly with other wireless devices within a network. In one aspect, the wide area network transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wireless networking technologies may be used, for example, WiMAX (802.16), etc. The mobile station may also include one or more local area network transceivers 206 that may be connected to one or more antennas 202. The local area network transceiver 206 may comprise suitable devices, hardware, and/or software for communicating with and/or detecting signals to/from LAN-WAPs 106, and/or directly with other wireless devices within a network. In one aspect, the local area network transceiver 206 may comprise a Wi-Fi (802.11x) communication system suitable for communicating with one or more wireless access points; however in other aspects, the local area network transceiver 206 may comprise communication systems suitable for communicating with another type of local area network, personal area network (e.g., Bluetooth), etc. Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106, femtocells, Bluetooth transceivers, and in some instances, WAN-WAPs 104, and etc. Specifically, in the description, when the term "WAP" is used, it should be understood that embodiments may include a mobile station that can exploit and verify signals received from a plurality of LAN-WAPs 106, femtocells, and/or plurality of WAN-WAPs 104, and/or a combination of technologies, using characterizing information that is known to be appropriate for the particular type of WAP in question. The specific type of WAP being utilized by the mobile station may depend upon the environment of operation. Moreover, the mobile station may dynamically select between the various types of WAPs.

An SPS receiver 208 may also be included in mobile station 200. The SPS receiver 208 may be connected to the one or more antennas 202 for receiving satellite signals. The SPS receiver 208 may comprise any suitable hardware and/or software for receiving and processing SPS signals. The SPS receiver 208 may request information and operations as appropriate from the other systems, and perform the calculations necessary to determine the mobile station 200's position using measurements obtained by any suitable SPS algorithm.

A motion sensor 212 may be coupled to processing unit 210 to provide relative movement and/or orientation information which is independent of motion data derived from signals received by the wide area network transceiver 204, the local area network transceiver 206 and the SPS receiver 208. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion sensor 212 may include a plurality of different types of devices and combine their outputs in order to provide motion information.

A processing unit 210 may be connected to the wide area network transceiver 204, local area network transceiver 206, the SPS receiver 208 and the motion sensor 212. The processing unit may include one or more microprocessors, microcontrollers, and/or digital signal processors that provide processing functions, as well as other calculation and control functionality. The processing unit 210 may also include memory 214 for storing data and software instructions for executing programmed functionality within the mobile station 200. The memory 214 may be on-board the processing unit 210 (e.g., within the same IC package), and/or the memory may be external memory to the processing unit and functionally coupled over a data bus. The details of software functionality associated with aspects of the disclosure will be discussed in more detail below.

A number of software modules and/or data tables may reside in memory 214 and be utilized by the processing unit 210 in order to manage communications, positioning and/or calibration determination functionality, and/or detect falsified WAPs, as will be described in more detail below. Further referring to FIG. 2, memory 214 may include and/or otherwise receive a positioning module 216, an application module 218, a received signal strength indicator (RSSI) module 220, a round trip time (RTT) module 222, calibration module 228, and/or a verification module 230. One should appreciate that the organization of the memory contents as shown in FIG. 2 is merely exemplary, and as such the functionality of the modules and/or data structures may be combined, separated, and/or be structured in different ways depending upon the implementation of the mobile station 200.

The application module 218 may be a process running on the processing unit 210 of the mobile station 200, which requests position information from the positioning module 216. Applications typically run within an upper layer of the software architectures, and may include, for example, Indoor Navigation, Buddy Locator, Shopping and Coupons, Asset Tracking, and location Aware Service Discovery. The positioning module 216 may derive the position of the mobile station 200 using information derived from various wireless signal models, and optionally from the calibration module 228. The wireless signal models may include, for example, an RTT model which may use the round trip times measured from signals exchanged with a plurality of WAPs. In order to accurately determine position using RTT techniques, reasonable estimates of a variety of parameters (such as processing delay) associated with each WAP should be known, and may determined using the calibration techniques. The measured RTTs may be determined by the RTT module 222, which can measure the timings of signals exchanged between the mobile station 200 and the WAPs to derive RTT information. Once measured, the RTT values may be passed to the positioning module 216 to assist in determining the position of the mobile station 200.

The positioning module 216 may utilize other wireless signal models and corresponding measurements for position determination. In one embodiment, the amplitude values of the signals transmitted by the WAPs may be used to provide signal strength information. These amplitude values may be determined in the form of RSSI measurements determined by RSSI module 220. The RSSI module 220 may provide amplitude and statistical information regarding the signals to the position module 216. The position module 216 may use this information and/or the RTT information to accurately determine position. The position may then be output to the application module 218 in response to its aforementioned application program request. In addition, the positioning module 216 may utilize a parameter database 224 for exchanging operational parameters. Such parameters may include the determined processing times for each WAP, the WAPs' positions in a common coordinate frame, various parameters associated with the network, initial processing time estimates, processing time estimates determined previously, etc.

In some embodiments, the mobile station 200 may perform calibration using the calibration module 228. The calibration module 228 may refine various parameters such as the processing time, which are used in one or more wireless signal models to accurately determine the position of the mobile station 200. The calibration module 228 may directly utilize RTT information from RTT module 222, position information of the mobile station 200 from positioning module 216, and/or RSSI information from RSSI module 220. Additional information, such as, for example, known locations of one or more wireless access points, may be obtained from parameter database 224. The calibration module 228 may refine and/or correct information associated with one or more wireless access points; and then provide this information back to the positioning module 216 for more accurate position determination of the mobile station. This calibration solution(s) may also be stored in parameter database 224 to update/improve the accuracy of information stored therein. Details of an exemplary calibration module may be found in "Wireless Position Determination Using Adjusted ROUND TRIP TIME MEASUREMENTS", which has been incorporated by reference. In other embodiments, calibration techniques set forth in "POST-DEPLOYMENT CALIBRATION FOR WIRELESS POSITION DETERMINATION" may be used, which has also been incorporated herein by reference.

The WAP verification module 230 may be used to compare the expected RTT of a WAP with the measured RTTs supplied by the RTT module 222. The expected RTT may be derived by combining the estimated processing delay for the WAP, retrieved from the parameter database 224 or the calibration module 228, with the estimated distance between the mobile station 200 and the WAP. By comparing the expected RTT for a given WAP and the measured RTT, the WAP verification module may determine if the RTT is consistent with operational parameters for the wireless network. Details of the techniques used within the WAP verification module are provided in subsequent sections of this disclosure.

In other embodiments, auxiliary information can also aid position determination/calibration, and may optionally include other position and/or motion data which may be determined from other sources. The auxiliary position data may be incomplete or noisy, but may be useful as another source of independent information for estimating the processing times of the WAPs. As illustrated in FIG. 2 using dashed lines, mobile station 200 may optionally store auxiliary position/motion data 226 in memory which may be derived from information received from other sources as described below. Moreover, in other embodiments, other information may include, but not be limited to, information that can be derived or based upon Bluetooth signals, beacons, RFID tags, and/or information derived from maps (e.g., receiving coordinates from a digital representation of a geographical map by, for example, a user interacting with a digital map).

In one embodiment, all or part of auxiliary position/motion data 226 may be derived from information supplied by motion sensor 212 and/or SPS receiver 208. In other embodiments, auxiliary position/motion data 226 may be determined through additional networks using non-RTT techniques (e.g., AFLT within a CDMA network). In certain implementations, all or part of auxiliary position/motion data 226 may also be provided by way of motion sensor 212 and/or SPS receiver 208 without further processing by processing unit 210. In some embodiments, the auxiliary position/motion data 226 may be directly provided by the motion sensor 212 and/or SPS receiver 208 to the processing unit 210. Position/motion data 226 may also include acceleration data and/or velocity data which may provide direction and speed. In other embodiments, position/motion data 226 may further include directionality data which may only provide direction of movement.

While the modules shown in FIG. 2 are illustrated in the example as being contained in memory 214, it is recognized that in certain implementations such procedures may be provided for or otherwise operatively arranged using other or additional mechanisms. For example, all or part of calibration module 228, positioning module 216 and/or application module 218 may be provided in firmware. Additionally, while in this example positioning module 216 and calibration module 228 are illustrated as being separate features, it is recognized, for example, that such procedures may be combined together as one procedure or perhaps with other procedures, or otherwise further divided into a plurality of sub-procedures.

Processing unit 210 may include any form of logic suitable for performing at least the techniques provided herein. For example, processing unit 210 may be operatively configurable based on instructions in memory 214 to selectively initiate one or more routines that exploit motion data for use in other portions of the mobile station 200.

The mobile station 200 may include a user interface 250 which provides any suitable interface systems, such as a microphone/speaker 252, keypad 254, and display 256 that allow user interaction with the mobile station 200. The microphone/speaker 252 provides for voice communication services using the wide area network transceiver 204 and/or the local area network transceiver 206. The keypad 254 comprises any suitable buttons/keys for user input. The display 256 may comprise any suitable display, such as, for example, a backlit LCD display, and may further include a touch screen for additional user input modes.

As used herein, mobile station 200 comprises a mobile station, and may be any portable or movable device or machine that is configurable to acquire wireless signals transmitted from, and transmit wireless signals to, one or more wireless communication devices or networks.

Figure 3:
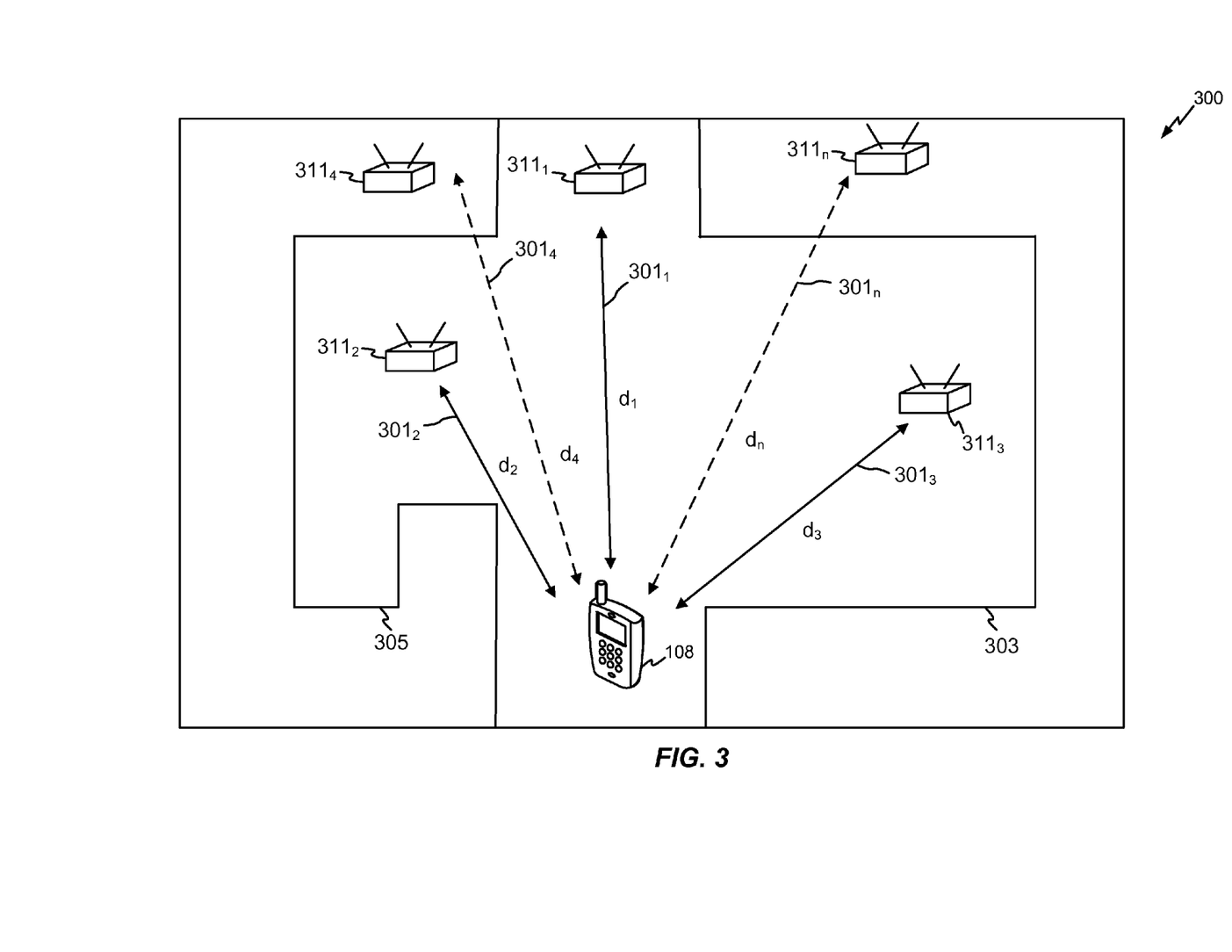
FIG. 3 is a diagram illustrating an exemplary indoor environment including a plurality of Local Area Network Wireless Access Points (LAN-WAPs) which may exchange packets with a mobile station.

FIG. 3 is a diagram illustrating an exemplary indoor environment including a plurality of LAN-WAPs 311 which may exchange packets with the mobile station 108. The mobile station 108 may be located inside a room 300 having any arbitrary structure which may include walls 303 and 305. Mobile station 108 may communicate with LAN-WAPs 311 via wireless links $301_1$-$301_n$ (where n is an integer equal to the number of wireless access points or wireless links).

Each LAN-WAP $311_i$ (where i=1, 2, ... n) may be separated from the mobile station 108 by a distance $d_i$. For example, LAN-WAP1 $311_1$ may be located a distance of $d_1$ from mobile station 108; LAN-WAP2 $311_2$ may be located a distance of $d_2$ from mobile station 108; LAN-WAP3 $311_3$ may be located a distance of $d_3$ from mobile station 108; LAN-WAP4 $311_4$ may be located a distance of $d_4$ from mobile station 108; and LAN-WAPn $311_n$ may be located a distance of $d_n$ from mobile station 108.

Using various wireless signal models, the distances between the mobile station and the LAN-WAPs 311 may be determined. For example, by using the round trip time, the distance $d_i$ (in feet) between each LAN-WAP $311_i$ and the mobile station 108 may be estimated by:

$$d_i = ((RTT - \Delta_i)/2) * (\text{speed of signal}) \qquad (1)$$

where the RTT may be the elapsed time (in ns) between the transmission of a packet sent from the mobile station 108 to a LAN-WAP $311_i$ and the corresponding response (e.g., acknowledgement (ACK)) received from the corresponding LAN-wireless access point (LAN-WAP $311_i$). The processing delay ($\Delta_i$) can be the delay (in ns) associated with each LAN-WAP $311_i$ during the reception/transmission of data. The "speed of signal" can be, for example, the speed of light in ft/ns. As mentioned above, for wireless access points having hardware-based MACs, the processing delay may typically be consistent enough over time whereby it may be used to characterize the LAN-WAP. The processing delays may be unique to the chipset implementing the hardware MAC, and can be used to identify models and/or manufactures of specific wireless access points.

Additional models may be used to estimate the distance, such as more precise RTT models than the simple one presented in Eq. 1 above, and/or signal strength models based upon RSSI. Descriptions of exemplary wireless signal models are presented in patent application entitled "WIRELESS POSITION DETERMINATION USING ADJUSTED ROUND TRIP TIME MEASUREMENTS," which has been incorporated by reference.

Figure 4:
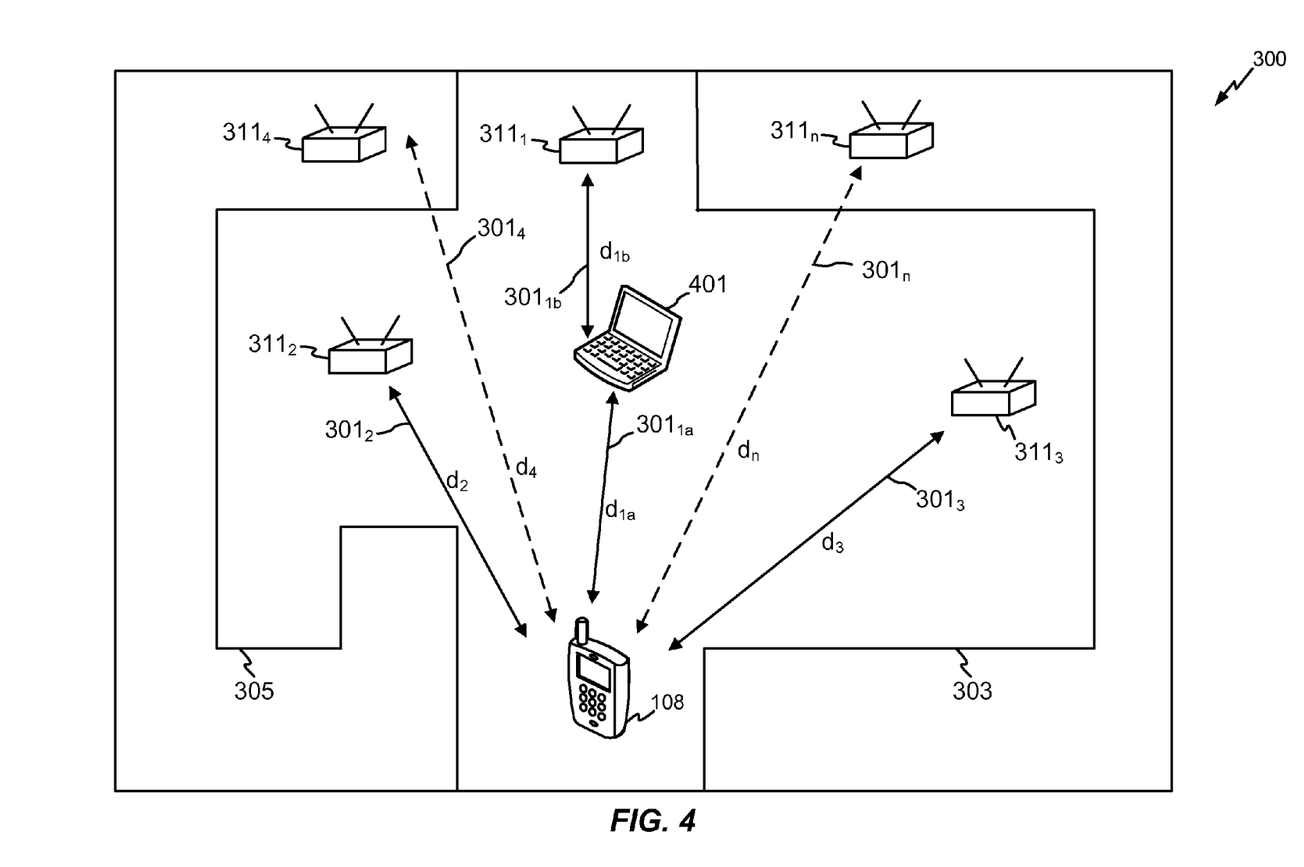
FIG. 4 is a diagram depicting the exemplary embodiment shown in FIG. 3 with the addition of a falsified wireless access point.

FIG. 4 is a diagram depicting the exemplary environment shown in FIG. 3 with the addition of a falsified wireless access point. Here, a falsified WAP 401 may masquerade as one of the LAN-WAPs 311 when presenting itself to mobile station 108. The falsified WAP 401 can be positioned between LAN-WAP1 311$_1$ and mobile station 108, being a distance $d_{1a}$ to the mobile station 108, and a distance $d_{1b}$ to LAN-WAP1 311$_1$.

The falsified WAP 401 may present a number of security risks which may include "man in the middle", "spoofing" and/or "phishing" types of cyber attacks. "Man in the middle" attacks may include having the falsified WAP 401 pass along requests to legitimate websites, while surreptitiously retaining sensitive information such as, for example credit card information, social security numbers, etc. "Spoofing" or "phishing" attacks could include presenting false information to the mobile when it attempts to contact server 112 to request Location Configuration Information (LCI) messages. In this instance, the falsified WAP may provide an address to an unauthorized server which in turn sends altered LCIs (which could include corrupted maps and/or false links masquerading as legitimate Points of Interest (POIs)).

In FIG. 4, falsified WAP 401 can imitate LAN-WAP1 311$_1$ in order to launch a "man-in-the-middle" attack and/or "phishing" attack against mobile station 108. Therefore, falsified WAP 401 "spoofs" mobile station 108 into believing that it is LAN-WAP1 311$_1$ via wireless link 301$_{1a}$, while the falsified WAP 401 can interface with LAN-WAP1 311$_1$ via wireless link 301$_{1b}$. Thus, falsified WAP 401 can gain access to all messages sent in both directions between LAN-WAP1 311$_1$ and mobile station 108.

However, in one embodiment, by leveraging known information about the processing delay for LAN-WAP 311$_1$, the mobile station 108 can detect that falsified WAP 401 is not a legitimate wireless access point and prevent the above-mentioned networking attacks. For example, by measuring the RTT to the falsified WAP 401 and using the expected processing delay (or estimated processing delay determined via calibration), the distance to the falsified WAP $d_{1a}$ may be estimated using a RTT model (e.g., equation 1 presented above). Because the processing delay of the falsified WAP 401 will likely be different that LAN-WAP 311$_1$, the distance $d_{1a}$ may be checked for unrealistic values (e.g., negative values or distances not within the network protocol's operation parameters, such as exceeding maximum range). Other checks may be performed using multiple measurements to generate a statistical profile. Moreover, other wireless models, such as those relating distance and RSSI, may be used to further the verification process. Details of this process are presented below in the discussion of FIG. 5. While wireless networking protocol may typically be IEEE 802.11x (e.g., Wi-Fi variants), other wireless protocols, such as Bluetooth, those involving femtocells, etc. may utilized with the embodiments presented herein.

Figure 5:
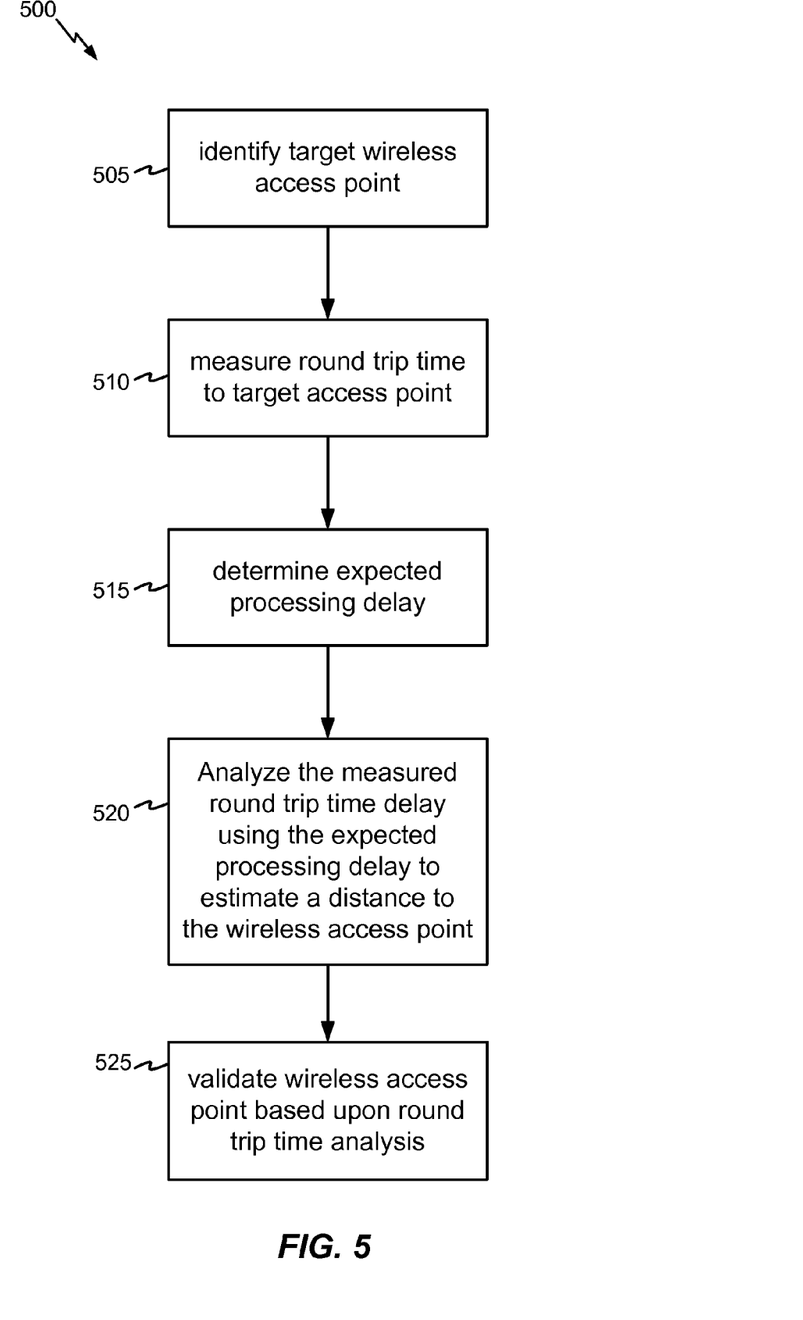
FIG. 5 is a flow chart illustrating an exemplary method for detecting a falsified wireless access point that may be performed by the mobile station.

FIG. 5 is a flow chart illustrating an exemplary method 500 for detecting a falsified wireless access point that may be performed by a mobile station (e.g., mobile station 108). The mobile station may first identify a target wireless access point (WAP) for validation (505). This may be performed by using the media access controller identification (MAC ID) of the WAP, which may be broadcast in a beacon signal to the mobile station. The mobile station may then measure a round trip time (RTT) delay to the target wireless access point (510).

In one embodiment, the RTT may be measured by transmitting a packet from the mobile station to the wireless access point. Upon transmission of the packet, a first time may be recorded when the transmitted packet was sent. The mobile station may then receive response packet from the wireless access point in response to the transmitted packet. The mobile station may record a second time marking when the response packet was received by the mobile station. In the RTT module 222 (FIG. 2), the difference between the second recorded time and the first recorded time may be computed as the RTT. When exchanging the packets, unicast packets may be used by the mobile station, and accordingly the mobile station may obviate associating with the target WAP.

Further referring to FIG. 5, the mobile station may then determine an expected processing delay of the target wireless access point (515). The expected processing delay may be determined using the MAC ID of the wireless access point, and the value may be retrieved from the parameter database 224 that may be stored in memory 214 of the mobile station (FIG. 2). Alternatively, the mobile station may obtain the expected processing delay from, for example, a secure server over a wireless network, which may be distinct from server 112 (FIG. 1).

The mobile station may then analyze the measured round trip time delay and the expected processing delay (520). This may include using an RTT ranging model to convert the RTT and the expected processing delay to an estimated distance between the mobile station and the target WAP. An example of such a ranging model is Equation (1).

The mobile station may then validate the wireless access point based upon the round trip time analysis performed in Block 520 (525). For example, the resulting distance value may be compared to expected operational ranges of the wireless access point to determine if the WAP is falsified. For example, if the resulting distance value is a negative value, or if the resulting distance value corresponds to a distance larger than the maximum range of the wireless access point, the WAP validation module 230 (FIG. 2) may conclude the target WAP is a falsified WAP.

For another embodiment, in Block 520, the mobile station may first estimate the processing delay of the target WAP using, for example, calibration techniques described in patent application "WIRELESS POSITION DETERMINATION USING ADJUSTED ROUND TRIP TIME MEASUREMENTS." The estimated processing delay and the expected processing delay may be compared, for example, by determining their difference. The magnitude of this difference may be used by the WAP validation module 230 (FIG. 2) to verify the target WAP. For example, the above difference magnitude may be compared to a threshold value, and if the difference magnitude is larger than the threshold, it is determined that the target WAP is a falsified WAP.

In another embodiment, Block 520 may determine an independent estimate of the distance to the wireless access point. The independent distance may then be analyzed for consistency with the distance corresponding to the measured round trip time delay (e.g., taking into account the expected processing delay and utilizing equation (1)). The independent estimate of distance may be based upon a signal strength (RSSI) model and associated measurements. The signal strength model may relate the RSSI and its corresponding distance to the signal source. In other embodiments, the independent distance to the WAP may be determined using any known techniques, which may include the use of beacons, and/or satellite position system (SPS) measurements. If the independent distance differs from the distance corresponding to the measured round trip time by say, more than a threshold value, the target WAP may be determined to be a falsified WAP, for example, by WAP validation module 230 (FIG. 2).

In yet another embodiment, one or more of the blocks in method 500 may be iterated/operated upon over a plurality of packet exchanges, so that statistics may be computed by the mobile station. The plurality of packet exchanges may be taken when the mobile station is at a fixed location, and/or over a time interval that is small enough so that the mobile station's location can be approximated as being fixed. The statistics may be used to determine whether the WAP is falsified or to further improve the detection accuracy of finding falsified WAPs. The statistics computation may include, but is not limited to, determining a mean, a variance, and/or a median value of measured round trip time delays. For example, in one embodiment, the statistics may include computing a variance value of the WIT measurements, which may be useful for distinguishing between a hardware-based MAC and a software based MAC. A software-based MAC may typically have processing delays which show considerably higher variance than processing delays corresponding to hardware-based MACs. For example, if the WAPs in a WLAN have hardware-based MACs, a WAP that has a processing delay corresponding to a software-based MAC may be determined to be a falsified WAP. In another example, a mean and/or median value may be useful for comparing measured RTTs with expected RTTs. Accordingly, the determined statistics values of the resulting time values and/or the estimated processing delays determined in Block 520 may be used to further assist in the validation of the target WAP in Block 525.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will be appreciated that embodiments include various methods for performing the processes, functions and/or algorithms disclosed herein. For example, as illustrated in FIG. 5, an embodiment can include a method of detecting a falsified wireless access point over a wireless network. The method may include identifying a target wireless access point for validation, and measuring a round trip time delay to the wireless access point. The method may further include determining an expected processing delay of the wireless access point, analyzing the measured round trip time delay and the expected processing delay, and validating the wireless access point based upon the analysis.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. The instructions, when executed by a machine, cause the machine to perform operations. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the claimed invention need not be performed in any particular order. Furthermore, although elements of the invention may be described or claimed in the singular, the plural is contemplated unless limitation to the singular is explicitly stated.

What is claimed is:

1. A method of detecting a falsified wireless access point over a wireless network, comprising:
   identifying a wireless access point for validation;
   measuring a round trip time delay to the wireless access point;
   determining an expected processing delay of the wireless access point;
   analyzing the measured round trip time delay using the expected processing delay to estimate a distance to the wireless access point; and
   validating the wireless access point based upon the analysis.

2. The method according to claim 1, wherein the measuring the round trip time delay further comprises:
   transmitting a packet from a mobile station to the wireless access point;
   recording a first time when the transmitted packet was sent;
   receiving a response packet from the wireless access point in response to the transmitted packet;
   recording a second time when the response packet was received; and
   computing a difference between the second recorded time and the first recorded time.

3. The method according to claim 2, wherein the transmitted packet utilizes a unicast packet whereby the mobile station does not associate with the wireless access point.

4. The method according to claim 1, wherein the mobile station and the wireless access point operate in accordance with IEEE 802.11 standards.

5. The method according to claim 1, wherein the identifying further comprises: determining a media access controller identification (MAC ID) of the wireless access point.

6. The method according to claim 5, wherein the determining the expected processing delay further comprises:
   retrieving the expected processing delay using the MAC ID of the wireless access point from memory within a mobile station, or from a server over a wireless network.

7. The method according to claim 1, wherein analyzing the measured round trip time delay using the expected processing delay further comprises:
   determining a resulting time value by subtracting the expected processing delay from measured round trip time.

8. The method according to claim 7, wherein the validating further comprises:
   comparing the resulting time value to expected operational ranges of the wireless access point.

9. The method according to claim 8, further comprising: determining that the wireless access point is a falsified wireless access point when the resulting time value is a negative value, or if the resulting time value corresponds to a distance larger than the maximum range of the wireless access point.

10. The method according to claim 1, wherein analyzing the measured round trip time delay using the determined expected processing delay further comprises:
    estimating a processing delay of the wireless access point; and
    determining a difference between the estimated processing delay and the expected processing delay of the wireless access point.

11. The method according to claim 10, wherein the validating further comprises:
    determining if a magnitude of the difference between the estimated processing delay and the expected processing delay exceeds a threshold.

12. The method according to claim 1, wherein the validating further comprises:
    determining an independent estimate of distance to the wireless access point; and
    determining whether the independent estimate of the distance is consistent with the estimated distance corresponding to the measured round trip time delay.

13. The method according to claim 12, wherein determining the independent estimate of the distance to the wireless access point may be based upon a signal strength (RSSI) model, beacons, and/or satellite position system (SPS) measurements.

14. The method according to claim 1, further comprising:
    performing the method of claim 1 over a plurality of packet exchanges;
    determining statistics based upon analysis of the plurality of packet exchanges; and
    determining whether the wireless access point is falsified based upon the statistics.

15. The method according to claim 14, wherein the plurality of packet exchanges is taken from a fixed location and/or within a time interval such that location can be approximated as being fixed.

16. The method according to claim 14, wherein the determining statistics further comprises determining a mean, a variance, and/or a median value of measured round trip time delays to determine whether the wireless access point is falsified.

17. The method according to claim 1, wherein analyzing the measured round trip time delay using the expected processing delay to estimate a distance to the wireless access point comprises:
    determining the distance to the wireless access point according to:

$$d_i = ((RTT - \Delta_i)/2) * (\text{speed of signal})$$

where $d_i$ is the distance to an $i^{th}$ wireless access point from a mobile station, RTT is the measured round trip time delay between the mobile station and the $i^{th}$ wireless access point, and $\Delta_i$ is the expected processing delay associated with the $i^{th}$ wireless access point.

18. The method according to claim 1, wherein determining the expected processing delay of the wireless access point comprises:
    determining by a mobile station an estimated processing delay of the wireless access point during calibration by the mobile station.

19. An apparatus for detecting a falsified wireless access point over a wireless network, comprising:
    a wireless transceiver;
    a processing unit coupled to the wireless transceiver; and
    a memory coupled to the processing unit, wherein the processing unit is configured to identify a wireless access point for validation,
    measure a round trip time delay to the wireless access point,
    determine an expected processing delay of the wireless access point, analyze the measured round trip time delay using the expected processing delay to estimate a distance to the wireless access point, and validate the wireless access point based upon the analysis.

20. The apparatus according to claim 19, wherein the processing unit is further configured to transmit, from the wireless transceiver, a packet to the wireless access point, record a first time when the transmitted packet was sent, receive, from the wireless transceiver, a response packet from the wireless access point in response to the transmitted packet, record a second time when the response packet was received, and compute a difference between the second recorded time and the first recorded time.

21. The apparatus according to claim 20, wherein the transmitted packet utilizes a unicast packet whereby the apparatus does not associate with the wireless access point.

22. The apparatus according to claim 19, wherein the apparatus and the wireless access point operate in accordance with IEEE 802.11 standards.

23. The apparatus according to claim 19, wherein the processing unit is further configured to determine a media access controller identification (MAC ID) of the wireless access point.

24. The apparatus according to claim 23, wherein the processing unit is further configured to retrieve the expected processing delay using the MAC ID of the wireless access point from the memory, or from a server over a wireless network.

25. The apparatus according to claim 19, wherein the processing unit is further configured to determine a resulting time value by subtracting the expected processing delay from measured round trip time.

26. The apparatus according to claim 25, wherein the processing unit is further configured to compare the resulting time value to expected operational ranges of the wireless access point.

27. The apparatus according to claim 26, wherein the processing unit is further configured to determine that the wireless access point is a falsified when the resulting time value is a negative value, or if the resulting time value corresponds to a distance larger than the maximum range of the wireless access point.

28. The apparatus according to claim 19, wherein the processing unit is further configured to estimate a processing delay of the wireless access point, and determine a difference between the estimated processing delay and the expected processing delay of the wireless access point.

29. The apparatus according to claim 28, wherein the processing unit is further configured to determine if a magnitude of the difference between the estimated processing delay and the expected processing delay exceeds a threshold.

30. The apparatus according to claim 19, wherein the processing unit is further configured to determine an independent estimate of distance to the wireless access point, and determine whether the independent estimate of the distance is consistent with the estimated distance corresponding to the measured round trip time delay.

31. The apparatus according to claim 30, wherein the determining the independent estimate of the distance to the wireless access point may be based upon a signal strength (RSSI) model, beacons, and/or satellite position system (SPS) measurements.

32. The apparatus according to claim 19, wherein the processing unit is further configured to operate over a plurality of packet exchanges, determine statistics based upon analysis of the plurality of packet exchanges, and determine whether the wireless access point is falsified based upon the statistics.

33. The apparatus according to claim 32, wherein the plurality of packet exchanges is taken from a fixed location and/or within a time interval such that location can be approximated as being fixed.

34. The apparatus according to claim 32, wherein the processing unit is further configured to determine a mean, a variance, and/or a median value of measured round trip time delays to determine whether the wireless access point is falsified.

35. An apparatus for detecting a falsified wireless access point over a wireless network, comprising:

means for identifying a wireless access point for validation;

means for measuring a round trip time delay to the wireless access point;

means for determining an expected processing delay of the wireless access point;

means for analyzing the measured round trip time delay using the expected processing delay to estimate a distance to the wireless access point; and means for validating the wireless access point based upon the analysis.

36. The apparatus according to claim 35, wherein the means for measuring the round trip time delay further comprises:

means for transmitting a packet from the apparatus to the wireless access point;

means for recording a first time when the transmitted packet was sent;

means for receiving a response packet from the wireless access point in response to the transmitted packet;

means for recording a second time when the response packet was received; and means for computing a difference between the second recorded time and the first recorded time.

37. The apparatus according to claim 36, wherein the transmitted packet utilizes a unicast packet whereby the apparatus does not associate with the wireless access point.

38. The apparatus according to claim 35, wherein the apparatus and the wireless access point operate in accordance with IEEE 802.11 standards.

39. The apparatus according to claim 35, wherein the means for identifying further comprises:

means for determining a media access controller identification (MAC ID) of the wireless access point.

40. The apparatus according to claim 39, wherein the means for determining the expected processing delay further comprises:

means for retrieving the expected processing delay using the MAC ID of the wireless access point from memory within the apparatus, or from a server over a wireless network.

41. The apparatus according to claim 35, wherein the means for analyzing the measured round trip time delay using the expected processing delay further comprises:

means for determining a resulting time value by subtracting the expected processing delay from measured round trip time.

42. The apparatus according to claim 41, wherein the means for validating further comprises:
means for comparing the resulting time value to expected operational ranges of the wireless access point.

43. The apparatus according to claim 42, further comprising:
means for determining that the wireless access point is a falsified when the resulting time value is a negative value, or if the resulting time value corresponds to a distance larger than the maximum range of the wireless access point.

44. The apparatus according to claim 35, wherein the means for analyzing the measured round trip time delay using the determined expected processing delay further comprises:
means for estimating a processing delay of the wireless access point; and
means for determining a difference between the estimated processing delay and the expected processing delay of the wireless access point.

45. The apparatus according to claim 44, wherein the means for validating further comprises:
means for determining if a magnitude of the difference between the estimated processing delay and the expected processing delay exceeds a threshold.

46. The apparatus according to claim 35, wherein the means for validating further comprise:
means for determining an independent estimate of distance to the wireless access point; and
means for determining whether the independent estimate of the distance is consistent with the estimated distance corresponding to the measured round trip time delay.

47. The apparatus according to claim 46, wherein determining the independent estimate of the distance to the wireless access point may be based upon a signal strength (RSSI) model, beacons, and/or satellite position system (SPS) measurements.

48. The apparatus according to claim 35, further comprising:
means for operating over a plurality of packet exchanges;
means for determining statistics based upon analysis of the plurality of packet exchanges; and
means for determining whether the wireless access point is falsified based upon the statistics.

49. The apparatus according to claim 48, wherein the plurality of packet exchanges is taken from a fixed location and/or within a time interval such that location can be approximated as being fixed.

50. The apparatus according to claim 46, further comprising:
means for determining a mean, a variance, and/or a median value of measured round trip time delays to determine whether the wireless access point is falsified.

51. A machine-readable non-transitory medium comprising instructions, which, when executed by a machine, cause the machine to perform operations, the instructions comprising:
instructions to identify a wireless access point for validation; instructions to measure a round trip time delay to the wireless access point;
instructions to determine an expected processing delay of the wireless access point;
instructions to analyze the measured round trip time delay using the expected processing delay to estimate a distance to the wireless access point; and
instructions to validate the wireless access point based upon the analysis.

52. The machine-readable medium according to claim 51, wherein the instructions to measure the round trip time delay further comprises:
instructions to transmit a packet to the wireless access point;
instructions to record a first time when the transmitted packet was sent;
instructions to receive a response packet from the wireless access point in response to the transmitted packet;
instructions to record a second time when the response packet was received; and
instructions to compute a difference between the second recorded time and the first recorded time.

* * * * *